(12) United States Patent
Lim (10) Patent No.: US 12,093,372 B2
(45) Date of Patent: Sep. 17, 2024

(54) METHOD CARRIED OUT IN ELECTRONIC CONTROL UNIT OF THE MULTI-CORE STRUCTURE, AND APPARATUS IMPLEMENTING THE SAME METHOD

(71) Applicant: HYUNDAI AUTOEVER CORP., Seoul (KR)

(72) Inventor: Jae Hyun Lim, Seoul (KR)

(73) Assignee: HYUNDAI AUTOEVER CORP., Seoul (KR)

( * ) Notice: Subject to any disclaimer, the term of this patent is extended or adjusted under 35 U.S.C. 154(b) by 332 days.

(21) Appl. No.: 17/535,031

(22) Filed: Nov. 24, 2021

(65) Prior Publication Data

US 2022/0188407 A1 Jun. 16, 2022

(30) Foreign Application Priority Data

Dec. 14, 2020 (KR) .................. 10-2020-0174638

(51) Int. Cl.
  *G06F 21/54* (2013.01)
  *G06F 21/55* (2013.01)
  *G06F 21/57* (2013.01)
  *G06F 21/60* (2013.01)

(52) U.S. Cl.
  CPC ............ *G06F 21/54* (2013.01); *G06F 21/554* (2013.01); *G06F 21/577* (2013.01); *G06F 21/602* (2013.01)

(58) Field of Classification Search
  None
  See application file for complete search history.

(56) References Cited

U.S. PATENT DOCUMENTS

| 8,522,192 B1 * | 8/2013 | Avalos ............... G06F 21/629 |
| | | 717/113 |
| 9,400,685 B1 * | 7/2016 | Ge ...................... G06F 9/3871 |
| 9,645,854 B2 | 5/2017 | Sander et al. |
| 9,727,382 B2 | 8/2017 | Koh et al. |
| 9,984,238 B1 * | 5/2018 | Roth .................. H04L 67/568 |
| 10,055,260 B2 | 8/2018 | Teshler et al. |
| 10,191,777 B2 | 1/2019 | Teshler et al. |
| 10,776,169 B2 | 9/2020 | Teshler et al. |
| 2012/0192201 A1 | 7/2012 | Sander et al. |

(Continued)

FOREIGN PATENT DOCUMENTS

| KR | 20130127480 A | 11/2013 |
| KR | 20160003502 A | 1/2016 |

(Continued)

OTHER PUBLICATIONS

Autosar, Specification of Crypto Service Manager, Autosar CP R20-11; 2020; 265 pp.

(Continued)

*Primary Examiner* — Lashonda Jacobs-Burton
(74) *Attorney, Agent, or Firm* — Lempia Summerfield Katz LLC (57) ABSTRACT

Provided is a method performed in an electronic control unit of a multi-core structure. The method comprises executing one or more first type security jobs on a first core, selecting one or more second type security jobs assigned for execution on a security dedicated core, and designating the selected second type security jobs for execution on the second core instead of the security dedicated core.

20 Claims, 7 Drawing Sheets

(56) References Cited

U.S. PATENT DOCUMENTS

| | | | |
|---|---|---|---|
| 2014/0136745 A1* | 5/2014 | Han | G06F 13/24 |
| | | | 710/267 |
| 2014/0137091 A1* | 5/2014 | Kim | G06F 8/654 |
| | | | 717/168 |
| 2014/0245308 A1* | 8/2014 | Moerman | G06F 9/526 |
| | | | 718/102 |
| 2016/0004570 A1 | 1/2016 | Koh et al. | |
| 2016/0098300 A1* | 4/2016 | Chang | G06F 9/4881 |
| | | | 718/103 |
| 2016/0283265 A1* | 9/2016 | Sakuma | G06K 15/1856 |
| 2017/0090982 A1* | 3/2017 | Govindarajan | G06F 9/4887 |
| 2017/0250964 A1* | 8/2017 | Edwards | H04L 63/20 |
| 2018/0189103 A1 | 7/2018 | Teshler et al. | |
| 2018/0349192 A1 | 12/2018 | Teshler et al. | |
| 2018/0357118 A1* | 12/2018 | Jang | G06F 11/1441 |
| 2019/0155650 A1 | 5/2019 | Teshler et al. | |
| 2020/0192722 A1* | 6/2020 | Lenz | G06F 9/5077 |
| 2022/0116213 A1* | 4/2022 | Pala | H04L 9/0894 |

FOREIGN PATENT DOCUMENTS

| | | |
|---|---|---|
| KR | 20160087274 A | 7/2016 |
| KR | 20180081332 A | 7/2018 |
| KR | 20190095963 A | 8/2019 |

OTHER PUBLICATIONS

Office Action cited in corresponding Korean patent application No. 10-2020-0174638; Feb. 26, 2022; 12 pp.

Requirements on Crypto Stack; Autosar, 2017; 31 pp.

* cited by examiner

METHOD CARRIED OUT IN ELECTRONIC CONTROL UNIT OF THE MULTI-CORE STRUCTURE, AND APPARATUS IMPLEMENTING THE SAME METHOD

CROSS-REFERENCE TO RELATED APPLICATION

This application claims priority to and the benefit of Korean Patent Application No. 10-2020-0174638, filed on Dec. 14, 2020, the disclosure of which is incorporated herein by reference in its entirety.

BACKGROUND

1. Field

The present disclosure relates to executing a security module in an electronic control unit.

2. Description of the Related Art

The statements in this section merely provide background information related to the present disclosure and may not constitute prior art.

A conventional automobile is a collection of mechanical devices. However, more and more electronic devices are being installed in automobiles. It is no exaggeration to say that the automobile is a collection of various electronic devices. As functions such as vehicle posture control, automatic parking, intelligent driving assistance, and autonomous driving become more common, more electronic devices are interacting with each other in automobiles.

As the number of electronic devices used in automobiles increases, standardization of the software used therein is desired. For this reason, an embedded software open platform called AUTOSAR, which was developed to increase the reusability of modules and improve the compatibility of parts for each vehicle, is widely used.

In an ECU (Electronic Control Unit) based on the AUTOSAR platform, the use of special ECU hardware units such as programmable hardware security modules (HSMs) is increasing.

This hardware security module (HSM) has the advantage of reducing the load on the main processor by reducing the time required for performing the cryptographic calculations. A special accelerator is used when performing cryptographic algorithms In addition, the HSM can create a space for storage of confidential data such as cryptographic keys through memory partitioning and can flexibly respond to various implementation requirements through the programmability of the HSM.

In ECUs based on the AUTOSAR platform, cryptographic services for security-related functions are provided by a CSM (Crypto Service Manager) module, and cryptographic calculations for implementing cryptographic services are provided by a so-called cryptographic driver. Since the software cryptographic driver (Crypto_SW) implements the actual security function as software, it is executed by a resource of the core of the task that made the call to the module. However, the hardware cryptographic driver (Crypto_HW) transmits only commands to the hardware security module (HSM) in the task that called the module, and the actual security function is operated in a separate core.

Therefore, the hardware cryptographic driver (Crypto_HW) only needs to asynchronously check whether or not the job is completed after requesting the HSM to execute a security job. However, in the case of the software cryptographic driver (Crypto_SW), driving the security job asynchronously may present challenges. First, since the security jobs and other tasks are executed on the same core, that it may take a lot of time to complete the security function (starvation) if there are many other high-priority tasks. In addition, since a task with a lower priority can be performed after the security jobs are completed, the execution time may increase exponentially for such lower priority tasks.

SUMMARY

One technical problem to be solved using various ones of the architectures and techniques discussed herein is to provide a method performed in an ECU (Electronic Control Unit) that can reduce the execution times of asynchronously driven security algorithms. The ECU may be multi-core and compliant with the AUTOSAR platform. An apparatus for implementing the method is also discussed.

Another technical problem to be solved using various ones of the architectures and techniques discussed herein is to provide a method performed in an ECU that can reduce the execution time for a security functions when there are many security jobs performed on the same core The ECU may be multi-core and compliant with the AUTOSAR platform. An apparatus for implementing the method is also discussed.

Another technical problem to be solved using various ones of the architectures and techniques discussed herein is to provide a method performed in an ECU that can reduce the effects on other tasks when executing a time-consuming asymmetric key-based security algorithm in an ECU. The ECU may be multi-core and compliant with the AUTOSAR platform. An apparatus for implementing the method is also discussed.

The technical problems solved by the discussed architectures and techniques are not limited to the technical problems mentioned above, and other technical problems not mentioned will be clearly recognized by those skilled in the art to be solved by the discussed architectures and techniques.

In an example, method performed in an electronic control unit of a multi-core structure including a first core and a second core that are general purpose cores, and a security dedicated core. The method comprises executing a first type of security jobs in the first core, selecting some of a second type of security jobs executed in the security dedicated core, and controlling the selected security jobs to be executed in the second core instead of the security dedicated core.

The first type of security jobs may be called in a synchronous method, wherein the second type of security jobs are called asynchronously.

Selecting some of a second type of security jobs executed in the security dedicated core may comprise determining a priority of each of the second type of security jobs, and selecting a job corresponding to the lowest priority among the second type of security jobs.

Determining a priority of each of the second type of security jobs may comprise estimating required time of each of the second type of security jobs, and determining a priority of each of the second type of security jobs based on the estimated required time.

Determining a priority of each of the second type of security jobs based on the estimated required time may comprise estimating required time of each of the security jobs when the second type of the security jobs are allocated to a queue and the number of the allocated security jobs is greater than or equal to a reference value, and assigning the lowest priority to a security job with the largest estimated required time.

Determining a priority of each of the second type of security jobs may comprise assigning a first priority to a security job corresponding to a symmetric key-based algorithm among the second type of security jobs, assigning a second priority lower than the first priority to a security job corresponding to a random number generation algorithm among the second type of security jobs, assigning a third priority lower than the second priority to a security job corresponding to a key exchange and derivation algorithm among the second type of security jobs, and assigning a fourth priority lower than the third priority to a security job corresponding to an asymmetric key-based algorithm among the second type of security jobs.

Determining a priority of each of the second type of security jobs may comprise assigning the lowest priority to a job corresponding to an asymmetric key-based algorithm among the second type of security jobs.

Determining a priority of each of the second type of security jobs may comprise determining a priority between security jobs based on the same algorithm among the second type of security jobs using a length of input data.

Determining a priority between security jobs based on the same algorithm among the second type of security jobs using a length of input data may comprise assigning a lower priority as the length of the input data is longer.

Designating the selected security jobs to be executed in the second core instead of the security dedicated core may comprise dequeueing the selected security jobs and transferring them to a cryptographic software driver (CRYPTO_SW) of the second core, and controlling the security jobs transferred to the cryptographic software driver to be executed in the second core.

The electronic control unit of the multi-core structure may be based on an AUTOSAR platform.

In an example, a computer readable non-transitory recording medium storing a computer program may cause a computer to perform the method.

In an example, computing device my comprises one or more processors, a communication interface for communicating with an external device, a memory for loading a computer program executed by the processor, and a storage for storing the computer program, wherein the computer program comprises instructions for performing operations comprising, executing a first type of security jobs in a first core, selecting some of a second type of security jobs executed in a security dedicated core, and controlling the selected security jobs to be executed in a second core instead of the security dedicated core.

The first type of security jobs may be called in a synchronous method, wherein the second type of security jobs are called in an asynchronous method.

Selecting some of the second type of security jobs executed in the security dedicated core may comprise determining a priority of each of the second type of security jobs, and selecting a job corresponding to the lowest priority among the second type of security jobs.

Determining a priority of each of the second type of security jobs may comprise estimating required time of each of the second type of security jobs, and determining a priority of each of the second type of security jobs based on the estimated required time.

Determining a priority of each of the second type of security jobs based on the estimated required time may comprise estimating required time of each of the security jobs when the second type of security jobs are allocated to a queue, and the number of the allocated security jobs is equal to or greater than a reference value, and assigning the lowest priority to a security job with the largest estimated required time.

Determining a priority of each of the second type of security jobs may comprise assigning a first priority to a security job corresponding to a symmetric key-based algorithm among the second type of security jobs, assigning a second priority lower than the first priority to a security job corresponding to a random number generation algorithm among the second type of security jobs, assigning a third priority lower than the second priority to a security job corresponding to a key exchange and derivation algorithm among the second type of security jobs, and assigning a fourth priority lower than the third priority to a security job corresponding to an asymmetric key-based algorithm among the second type of security jobs.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

These and/or other aspects become apparent and more readily appreciated from the following description of the embodiments, taken in conjunction with the accompanying drawings in which.

The drawings described herein are for illustration purposes only and are not intended to limit the scope of the present disclosure in any way.

DETAILED DESCRIPTION

Hereinafter, embodiments of the present disclosure are described with reference to the attached drawings. Advantages and features of the present disclosure and methods of accomplishing the same may be understood more readily by reference to the following detailed description and the accompanying drawings. The present disclosure may, however, may be implemented in many different forms and should not be construed as being limited to the embodiments set forth herein. Rather, these embodiments are provided so that this disclosure is thorough and complete and will fully convey the concept of the disclosure to those having ordinary skill in the art.

In adding reference numerals to the components of the drawings, it should be noted that the same reference numerals are assigned to the same components as much as possible even though they are shown in different drawings. In addition, when it is determined that the detailed description of the related well-known configuration or function may obscure the gist of the present disclosure, the detailed description thereof may be omitted.

Unless otherwise defined, terms used in the present specification (including technical and scientific terms) may be used in a sense that can be commonly understood by those skilled in the art. The singular also includes the plural unless specifically stated otherwise in the phrase.

In addition, in describing the component of this present disclosure, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, some embodiments are described in detail with reference to the accompanying drawings.

Figure 1:
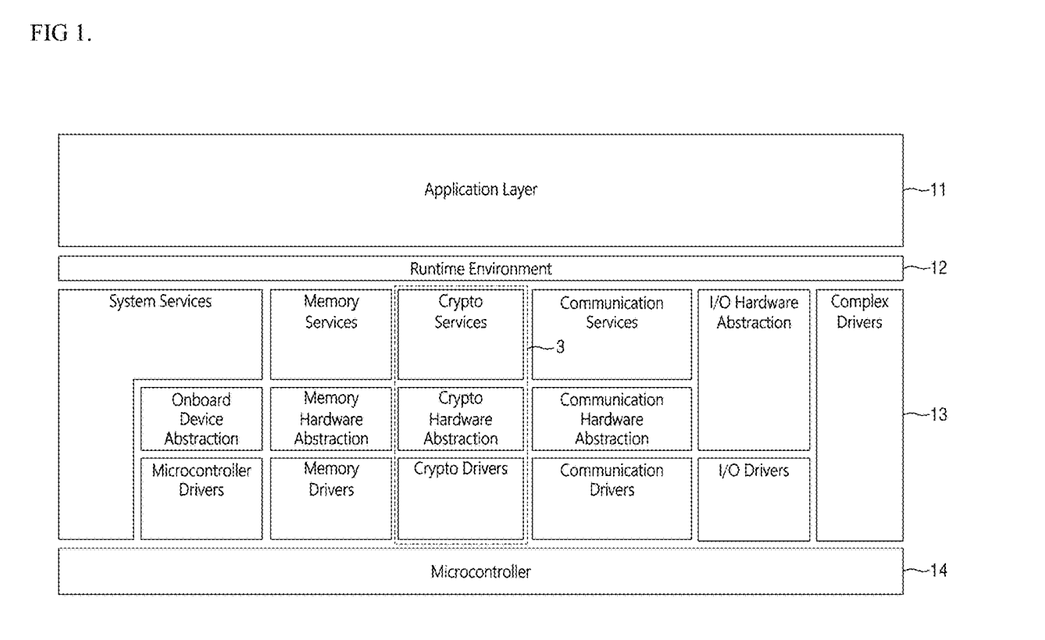
FIG. 1 is a configuration diagram of an example AUTOSAR platform.

FIG. 1 is a configuration diagram of the AUTOSAR platform. Referring to FIG. 1, the software of AUTOSAR is may be composed of three layers: a SWC (Software Component) 11, a RTE (Run Time Environment) 12, and a BSW (Basic Software) 13. In the AUTOSAR standard platform, several components have input/output ports and communicate with each other (e.g., virtually through CBD (Component-Based Software Development)).

SWC 11 is located at the top and performs engine, automatic transmission, and brake control functions, and is arranged in a virtual network called VFB (Virtual Functional Bus) and interlocked with an ECU (Electronic Control Unit). The RTE 12 is located between the SWC 11 and the BSW 13 and provides an interface for data exchange therebetween. The RTE 12 may be middleware in that it is not dependent on hardware to the SWC 11 and performs communication connection between modules. The BSW 13 is located at the lowest layer and provides services for performing jobs required by the SWC 11 such as an operating system (OS) interactions, device driver interaction, and communication handling.

The BSW 13 includes a service layer, a hardware abstraction layer (HAL), and a microcontroller abstraction layer (MCAL).

The service layer performs service functions such as memory operations, communication network interactions, and system interactions, and the HAL layer provides transceivers abd/or interface drivers that can use MCAL on the upper MCAL for each device below. The MCAL layer is a hardware-dependent part and consists of a communication driver of the OSI (Open Systems Interconnect) data link layer, an analog digital I/O (Input/Output) driver such as for ADC (Analog-to-Digital Converter), PWM (Pulse Width Modulation), and DIO (Digital Input/Output), a memory driver such as EEPROM (Electronically Erasable Programmable Read Only Memory) and/or Flash drivers, and a device driver area of the peripheral microcontroller.

In the illustrated configuration, the security service area 3 of the BSW 13 is composed of a cryptographic service, a cryptographic hardware abstraction, and a cryptographic driver, and provides a function for hardware security.

Figure 2:
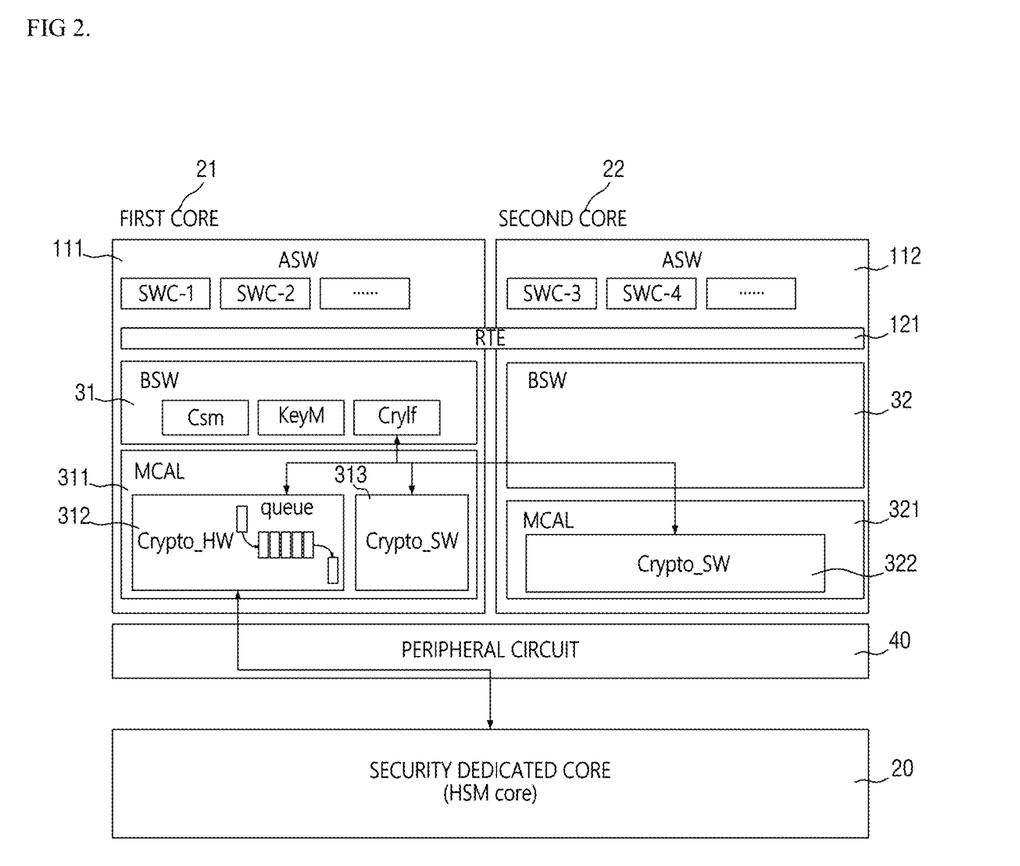
FIG. 2 is a configuration diagram of an example electronic control unit of a multi-core structure.

FIG. 2 is a configuration diagram of an electronic control unit of a multi-core structure according to an embodiment of the present disclosure. Referring to FIG. 2, the electronic control unit based on the AUTOSAR platform according to an embodiment of the present disclosure has a multi-core structure that includes a first core 21 and a second core 22, which are general purpose cores, and a security designated core 20. The security dedicated core 20 may be implemented as an HSM (Hardware Security Modules) core for, for example, HSM.

In the illustrated example, the electronic control unit based on the AUTOSAR platform includes layers of an ASW 111, BSW 31, and MCAL 311 executing in the first core 21, which is a general purpose core, and an ASW 112, BSW 32, and MCAL 321 executing in the second core 22. A plurality of software components (SWC-1, SWC-2, etc.) are executed in the ASW 111 of the first core 21, and the security algorithm is sequentially performed in the BSW 31 according to the execution of the software components (SWC-1, SWC-2, etc.). The security algorithm performed in the BSW 31 includes, for example, CSM (Crypto Service Manager), KeyM, and CryIF (Crypto Interface).

The security algorithm performed in the BSW 31 arrives at the hardware cryptographic driver (Crypto_HW) 312 of the MCAL 311 through the security stack, and a plurality of security jobs are allocated to a queue by the hardware cryptographic driver (Crypto_HW) 312. In this case, the plurality of security jobs allocated to the queue may be jobs that asynchronously executed and, in some cases, may correspond to a security function that takes a relatively long time to complete. Asynchronous execution does not wait for a value to be returned after calling a function, but allows other jobs to be executed before it is returned.

On the other hand, the jobs executed by the software cryptographic driver (Crypto_SW) 313 of the MCAL 311 are security jobs that are called synchronously, and, in some cases, may correspond to a security function that may complete in a relatively short time. Synchronous execution waits for a value to be returned after calling a function, and then executes another job when the value is returned. The security jobs that are called in this synchronous method are executed in the first core 21.

The hardware cryptographic driver (Crypto_HW) 312 transmits only a execution command to the hardware security module (HSM). For example, a command to execute a plurality of security jobs allocated to the queue, and the actual execution of the security job is done in the security dedicated core 20.

In various embodiments, if the number of security jobs allocated to the queue is less than the threshold, all security jobs may be executed by the security dedicated core 20. On the other hand, if the number of security jobs allocated to the queue is equal to or greater than the threshold, some of the security jobs may be executed in the second core 22 instead of the security dedicated core 20. Here, the security jobs executed in the second core 22 may be executed by the software cryptographic driver (Crypto_SW) 322 mapped to the task of the second core 22.

In this case, a criterion for selecting the security jobs to be executed in the second core 22 instead of the security dedicated core 20 may be determined according to the priority of each of the security jobs. As an embodiment, the required time of each of the security jobs allocated to the queue may be estimated, and a lower priority may be assigned as the estimated required time is longer. Accordingly, high-priority security jobs may be executed in the security dedicated core 20, and low-priority security jobs may be executed in the second core 22 instead of the security dedicated core 20.

That is, when a time-consuming security job is executed in the security dedicated core 20, the execution of other security jobs may be delayed, resulting in a problem that takes a lot of time to complete the security function. Accordingly, in order to solve this problem, security jobs that take a long time are executed in the second core 22 instead of the security dedicated core 20, thereby reducing the execution time of the security algorithm.

In some embodiments, the priority of the security jobs assigned to the queue may be determined according to the type of security algorithm used in each security job. For example, the highest first priority may be assigned to a security job that takes a short time to complete (e.g., a symmetric key-based algorithm and/or other low-resource consumption job), and a second priority lower than the first priority may be assigned to a security job that takes somewhat longer to execute (e.g., a random number generation algorithm). In addition, a third priority lower than the second priority may be assigned to a security job that takes longer than the second job (e.g., a key exchange and derivation algorithm), and a fourth priority lower than the third priority may be assigned to a (longest to execute) security job (in this illustrative example, this may correspond to an asymmetric key-based algorithm or other resource intensive algorithm).

That is, when all of the four types of security jobs are allocated to the queue, the security jobs corresponding the lowest fourth priority may be executed in the second core 22. At this time, among the security jobs waiting in the queue, security jobs corresponding to the asymmetric key-based algorithm may be dequeued and the dequeued security jobs may be transferred to the software cryptographic driver (Crypto_SW) 322 of the second core 22 for execution.

As described above, according to various embodiments, it is possible to reduce the execution time of a security algorithm driven in an asynchronously, and to solve the problem that it takes a lot of time to complete the security function when there are many security jobs performed in the same core.

Figure 3:
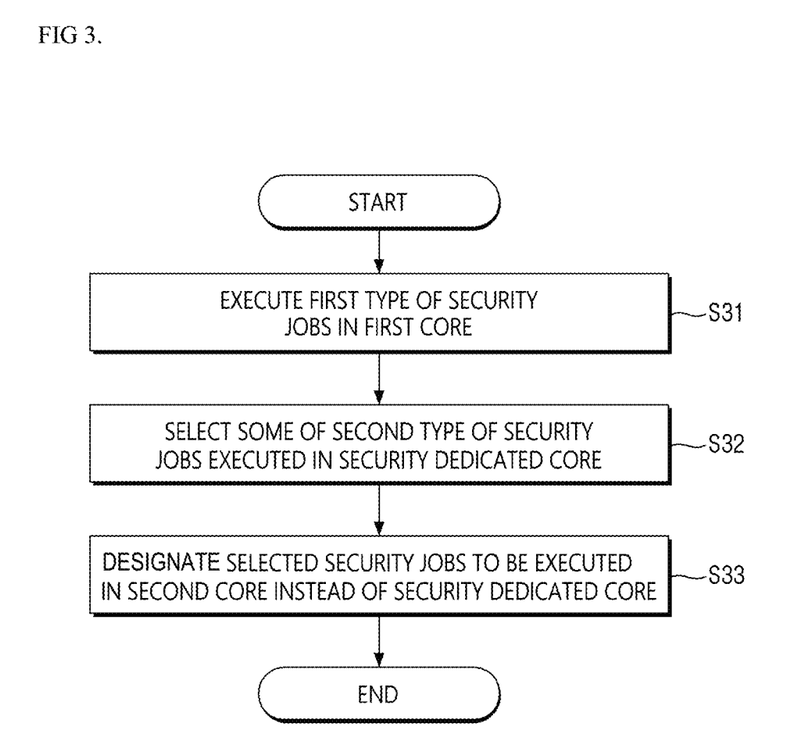
FIGS. 3 to 5 are flowcharts for describing a method performed in an electronic control unit of a multi-core structure.
Figure 4:
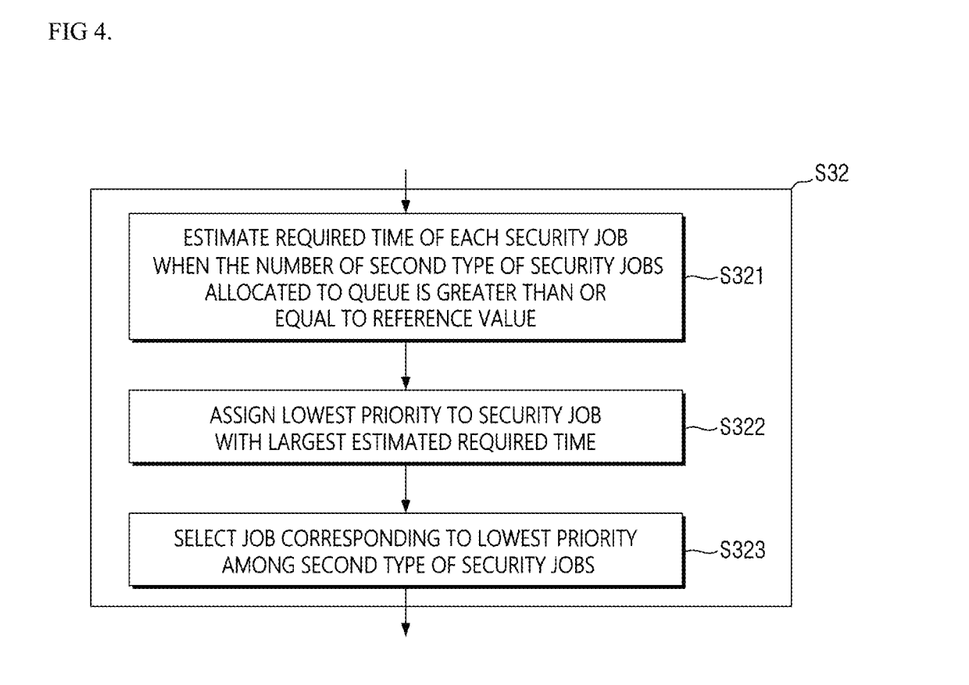
Figure 5:
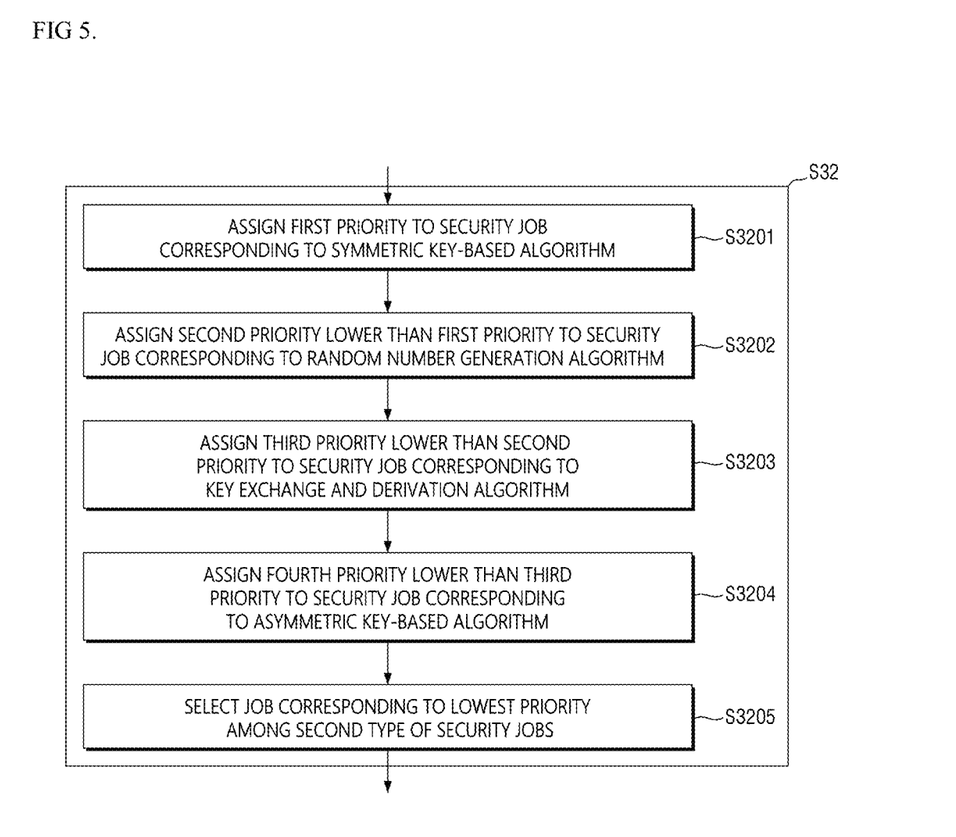

FIGS. 3 to 5 include flowcharts showing various methods performed in an ECU, which may be multi-core.

Figure 7:
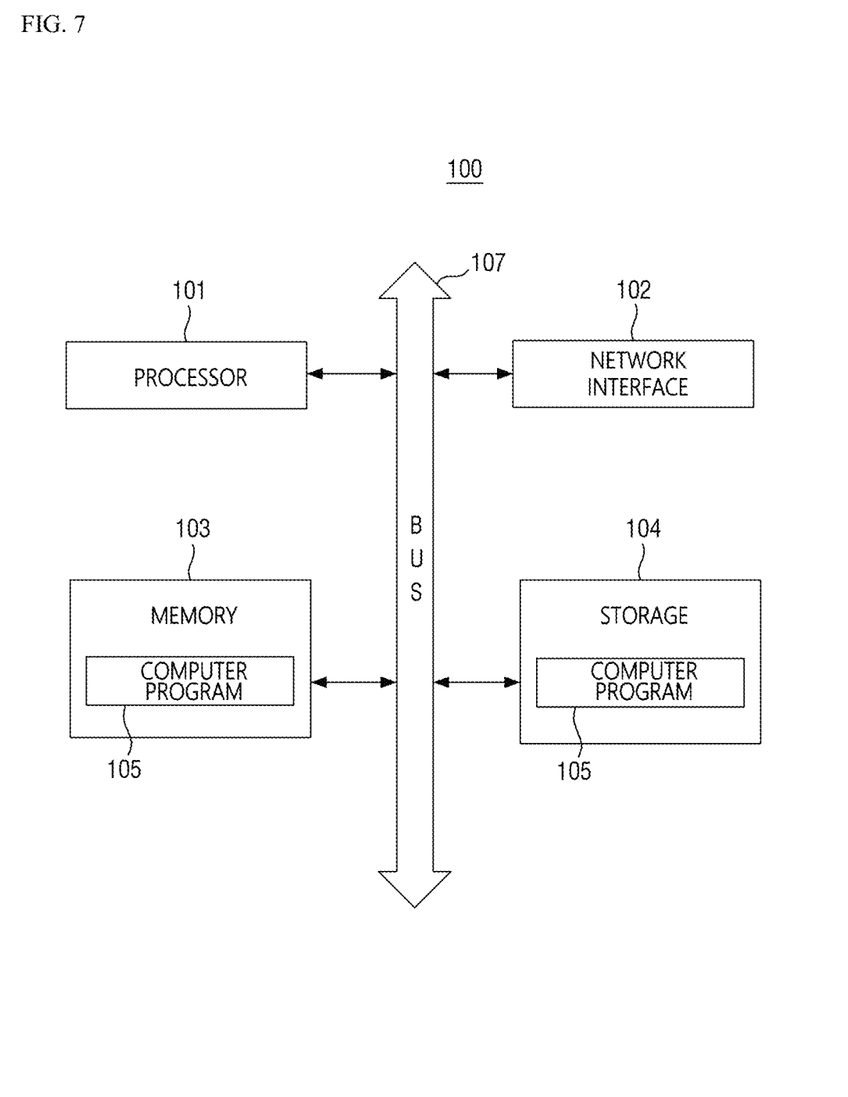
FIG. 7 is a hardware configuration diagram of an example computing device that may implement methods.

In various embodiments, the method ac may be executed by the computing device 100 illustrated in FIG. 7. The computing device 100 executing the method according to the present embodiment may be a computing device having an application program execution environment. It should be noted that the description of the subject performing various operations is implied to be the computing device 100 (or device capable of similar functionality).

Referring to FIG. 3, in operation S31, a first type of security jobs are executed in the first core 21, and in operation S32, some of a second type of security jobs executed in the security dedicated core 20 are selected. Here, the first type of security jobs may be called in a synchronously, and the second type of security jobs may be called in an asynchronously. Synchronous execution waits for the value to be returned after calling the function, and then executes another job when the value is returned. Asynchronous execution does not wait for the value to be returned after calling the function, and allows other jobs to be executed before it is returned.

In some cases, operation S32 may include determining a priority of each of the second type of security jobs, and an operation of selecting a job corresponding to the lowest priority.

Referring to FIG. 4, operation S32 may include operation S321 estimating the required time of each of security jobs when the number of the second type of security jobs allocated to the queue is equal to or greater than a reference value, operation S321 assigning the lowest priority to a security job with the largest estimated required time, and operation S323 selecting a job corresponding to the lowest priority among the second type of security jobs.

In various embodiments, referring to FIG. 5, operation S32 may include operation S3201 assigning a first priority to a security job corresponding to a symmetric key-based algorithm, operation S3202 assigning a second priority lower than the first priority to a security job corresponding to a random number generation algorithm, operation S3203 assigning a third priority lower than the second priority to a security job corresponding to a key exchange and derivation algorithm, operation S3203 assigning a fourth priority lower than the third priority to a security job corresponding to an asymmetric key-based algorithm, and operation S3204 selecting a job corresponding to the lowest priority. That is, among the security jobs waiting in the queue, different priorities are assigned according to the type of the security algorithm performed by the security job, and the lowest priority may be assigned to the job corresponding to the type that takes the longest of the pending jobs, which is this illustrative example is the asymmetric key-based algorithm. Nevertheless, various ones of the other security jobs may be assigned lower priorities that the asymmetric key-based algorithm, if the particular parameters and/or algorithm execution conditions result in longer execution times that that of the asymmetric key-based algorithms being used. Further, the priority may be assigned according to an average or expected execution time for a particular type of security job. In some cases, an individual execution instance may be shorter or longer than the average or expected execution time for any of the security jobs.

In some cases, operation S32 may include an operation in which a priority between security jobs based on the same algorithm (or in some case different algorithms) among the second type of security jobs is determined using the length of input data. For example, when two different jobs using an asymmetric key-based algorithm are waiting in a queue, a lower priority may be assigned to a job with a longer input data length among the two jobs. In some cases, data input length may be used to assign priority regardless of the algorithm used.

In operation S33, the selected security job is designated for execution in the second core 22 instead of the security dedicated core 20. In some cases, operation S33 may include dequeueing the security jobs selected in operation S32, transferring the dequeued security jobs to the cryptographic software driver (CRYPTO_SW) 322 of the second core 22, and an executing the security job transferred to the cryptographic software driver (CRYPTO_SW) 322 in the second core 22.

In various embodiments, it is possible to reduce the time taken to complete the security function when there are many security jobs performed on the same core. In addition, when performing certain time-consuming asymmetric key-based security algorithms, it is possible to reduce the effect on other tasks.

Figure 6:
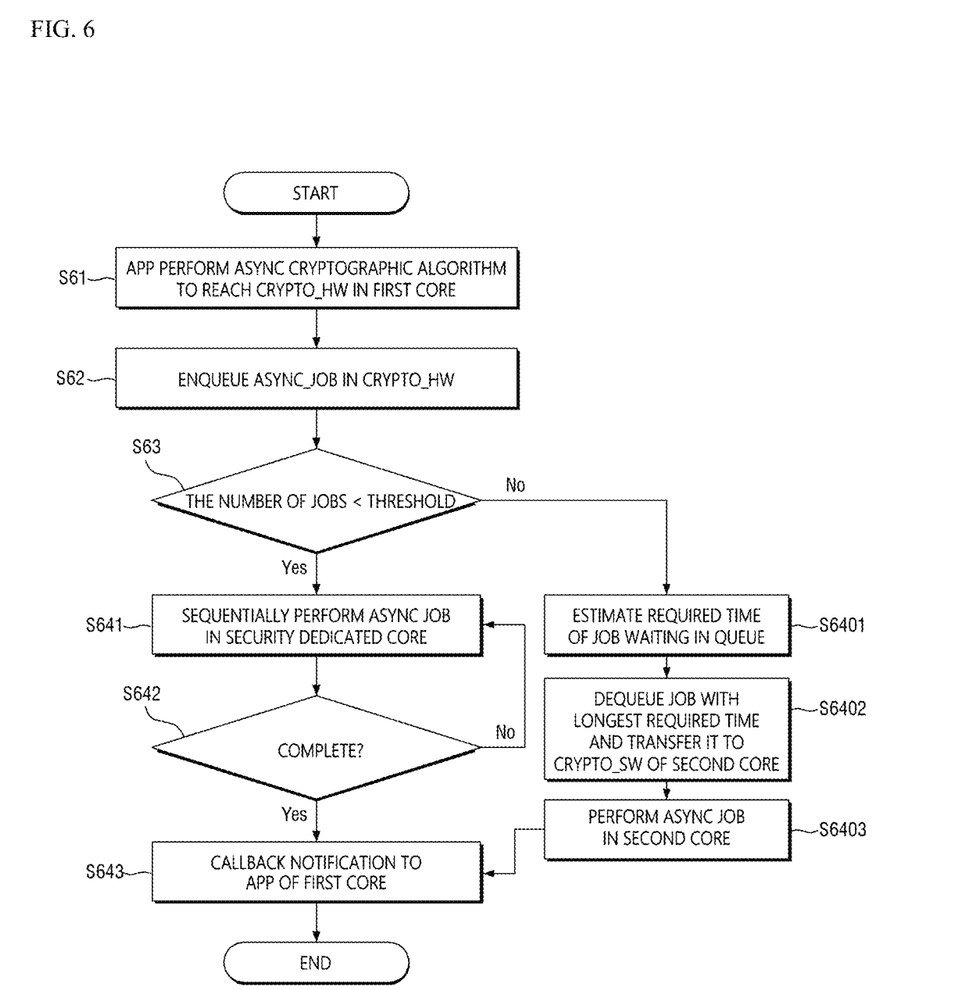
FIG. 6 is a flowchart showing an example process for executing a second type of security jobs.

FIG. 6 includes flowchart illustrating an example process for executing a second type of security jobs. Referring to FIG. 6, an example asynchronous process for executing a security job in an ECU is shown.

In operation S61, the application asynchronously performs the cryptographic algorithm through execution of the task on the first core 21, and communicates with the hardware cryptographic driver (Crypto_HW) 312 through the security stack. At this time, the cryptographic algorithm may include, for example, CSM (Crypto Service Manager), KeyM, CryIF (Crypto Interface), and the like.

In operation S62, a plurality of asynchronously called jobs are enqueued by the Crypto_HW 312. In operation S63, it is determined whether the number of the enqueued plurality of jobs exceeds than a threshold.

If the number of the plurality of jobs is less than the threshold, in operation S641, a plurality of jobs are sequentially performed in the security dedicated core 20. In operation S642, when the performance of the plurality of jobs is completed, the completion of the security job is notified to the application of the first core 21 (operation S643, callback notification).

If, the number of the plurality of jobs is equal to or greater than the threshold (e.g., or otherwise exceeds the threshold), in operation S6401, the required time of each of the plurality of jobs waiting in the queue is estimated. In operation S6402, the security job with the longest required time is dequeued, and the dequeued security job is transferred to the software cryptographic driver (Crypto_SW) 322 of the second core 22. Accordingly, in operation S6403, when the performance of the security jobs transferred from the second core 22 to the Crypto_SW 322 is completed, the completion of the security job is notified to the application of the first core 21 (operation S643, callback notification).

As described above, various embodiments may reduce the time taken to complete a security function when there are many security jobs performed on the same core. In addition, it is possible to reduce the effects on other tasks when performing a time-consuming security algorithm.

FIG. 7 is a hardware configuration diagram of an example computing device that may implement methods according to some embodiments of the present disclosure.

Referring to FIG. 7, the computing device 100 may include one or more processors 101, a bus 107, a network interface 102, a memory 103 (which loads a computer program 105 executed by the processors 101), and a storage 104 for storing the computer program 105.

FIG. 7 illustrates select components related to various embodiments. Therefore, it should be appreciated by those having ordinary skill in the art that the present disclosure may further include other purpose components in addition to the components shown in FIG. 7. Further, various other components may be used to implement the technique to implementations consistent with and/or implicated by the examples discussed herein.

The computing device 100 may be implemented as, for example, an electronic device mounted on an automobile.

The processor 101 controls the overall operation of each component of the computing device 100. The processor 101 may be, for example, an ECU (Electronic Control Unit) implemented in each electronic device mounted on an automobile.

In various embodiments, the processor 101 may be implemented as an ECU of a multi-core structure including one or more cores (e.g., a first core and a second core that are general purpose cores), and a security dedicated core, and in this case, the ECU of the multi-core structure may be based on the AUTOSAR platform.

The processor 101 controls overall operations of each component of computing device 100. The processor 101 may be configured to include at least one of a Central Processing Unit (CPU), a Micro Processor Unit (MPU), a Micro Controller Unit (MCU), a Graphics Processing Unit (GPU), or any type of processor capable of executing instructions for the coordination of operations. Further, the processor 101 may perform calculations on at least one application or program for executing a method/operation according to various embodiments. The computing device 100 may have one or more processors.

The memory 103 stores various data, instructions and/or information. The memory 103 may load one or more programs 105 from the storage 104 to execute methods/operations according to various embodiments of the present disclosure. An example of the memory 103 may be a RAM, but is not limited thereto.

The bus 107 provides communication between components of computing device 100. The bus 107 may be implemented as various types of bus such as an address bus, a data bus and a control bus.

The network interface 102 supports wired and/or wireless internet communication of the computing device 100. The network interface 102 may support various communication methods other than internet communication. To this end, the network interface 102 may be configured to comprise a communication module capable of data transport.

The storage 104 can non-temporarily store one or more computer programs 105. The storage 104 may be configured to comprise a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 105 may include one or more instructions, on which the methods/operations according to various embodiments are implemented. When the computer program 105 is loaded on the memory 103, the processor 101 may perform the methods/operations in accordance with various embodiments by executing the one or more instructions.

As an embodiment, the computer program 105 may include instructions for performing an operation of executing a first type of security jobs in a first core, selecting some of a second type of security jobs executed in a security dedicated core, and designating the selected security jobs to be executed in a second core instead of the security dedicated core.

The technical features of the present disclosure described so far may be embodied as computer readable codes on a computer readable medium. The computer readable medium may be, for example, a removable recording medium (CD, DVD, Blu-ray disc, USB storage device, removable hard disk), a fixed recording medium (ROM, RAM, computer equipped hard disk), and/or other computer readable medium that may be non-transitory and/or other than a transitory signal. The computer program recorded on the computer readable medium may be transmitted to other computing device via a network such as internet and installed in the other computing device, thereafter being used in the other computing device.

Although operations are shown in a specific order in the drawings, it should not be understood that desired results can still be obtained when various ones of the operations are inverted and/or performed in parallel. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

While various implementations have been particularly illustrated and described, it will be understood by those having ordinary skill in the art that various changes in form and detail may be made therein without departure from the disclose architectures and techniques. The various example

What is claimed is:

1. A method performed in an electronic control unit of a multi-core structure including a first core and a second core, and a security dedicated core different from the first and second cores, the method comprising:
   executing one or more first type security jobs in the first core;
   selecting security jobs corresponding to an asymmetric key-based algorithm from among one or more second type security jobs assigned for execution in the security dedicated core; and
   designating the selected security jobs to be executed in the second core instead of the security dedicated core.

2. The method of claim 1, wherein the first type security jobs are called synchronously,
   wherein the second type of security jobs are called in asynchronously.

3. The method of claim 1, further comprising:
   determining a priority of each of the second type security jobs; and
   selecting a job corresponding to a lowest priority among the second type security jobs.

4. The method of claim 3, wherein determining a priority of each of the second type security jobs comprises,
   estimating an execution time for each of the second type security jobs; and
   determining a priority of each of the second type security jobs based on the estimated execution time.

5. The method of claim 4, wherein determining a priority of each of the second type security jobs comprises,
   estimating the execution time for each of the security jobs when the second type security jobs are allocated to a queue and a number of the allocated security jobs is greater than or equal to a reference value; and
   assigning the lowest priority to a security job with the longest estimated execution time.

6. The method of claim 3, wherein determining the priority of each of the second type security jobs comprises,
   assigning a first priority to a second type security job corresponding to a symmetric key-based algorithm;
   assigning a second priority lower than the first priority to a second type security job corresponding to a random number generation algorithm;
   assigning a third priority lower than the second priority to a second type security job corresponding to a key exchange and derivation algorithm; and
   assigning a fourth priority lower than the third priority to a second type security job corresponding to an asymmetric key-based algorithm.

7. The method of claim 3, wherein determining the priority of each of the second type security jobs comprises,
   assigning the lowest priority to a second type security job corresponding to an asymmetric key-based algorithm.

8. The method of claim 3, wherein determining the priority of each of the second type security jobs comprises,
   determining a priority, using a length of input data, among two or more second type security jobs that use the same algorithm.

9. The method of claim 8, wherein determining a priority using the length of input data comprises,
   lowering the priority as the length of the input data increases.

10. The method of claim 1, wherein designating the selected security jobs to be executed in the second core instead of the security dedicated core comprises,
    dequeueing the selected security jobs and transferring the selected security jobs to a cryptographic software driver (CRYPTO_SW) of the second core; and
    designating the security jobs transferred to the cryptographic software driver for execution on the second core.

11. The method of claim 1, wherein the electronic control unit of the multi-core structure includes an Automotive Open System Architecture (AUTOSAR) compliant platform.

12. The method of claim 1 wherein the first core, the second core, or both comprise a general purpose processor.

13. A computing device comprising:
    one or more processors;
    a communication interface for communicating with an external device;
    a memory for loading a computer program executed by the one or more processors; and
    a storage for storing the computer program,
    wherein the computer program comprises instructions for performing operations comprising:
      executing one or more first type security jobs in a first core;
      selecting security jobs corresponding to an asymmetric key-based algorithm from among one or more second type security jobs assigned for execution in a security dedicated core; and
      designating the selected security jobs to be executed in a second core instead of the security dedicated core.

14. The computing device of claim 13, wherein the first type of security jobs are called in a synchronous method,
    wherein the second type of security jobs are called asynchronously.

15. The computing device of claim 13, wherein the computer program further comprises instructions for performing operations comprising:
    determining a priority of each of the second type security jobs; and
    selecting a job corresponding to a lowest priority among the second type security jobs.

16. The computing device of claim 15, wherein determining a priority of each of the second type security jobs comprises,
    estimating an execution time for each of the second type security jobs; and
    determining a priority of each of the second type security jobs based on the estimated execution time.

17. The computing device of claim 15, wherein determining a priority of each of the second type security jobs comprises,
    estimating an execution time for each of the security jobs when the second type security jobs are allocated to a queue and a number of the allocated security jobs is greater than or equal to a reference value; and
    assigning the lowest priority to a security job with the longest estimated execution time.

18. The computing device of claim 15, wherein determining the priority of each of the second type security jobs comprises,
    assigning a first priority to a second type security job corresponding to a symmetric key-based algorithm;
    assigning a second priority lower than the first priority to a second type security job corresponding to a random number generation algorithm;

assigning a third priority lower than the second priority to a second type security job corresponding to a key exchange and derivation algorithm; and assigning a fourth priority lower than the third priority to a second type security job corresponding to an asymmetric key-based algorithm.

19. A product comprising:

non-transitory machine-readable media; and instructions stored on the non-transitory machine-readable media, the instructions configured to, when executed, cause a machine to perform operations of:

executing one or more first type security jobs in a first core;

selecting security jobs corresponding to an asymmetric key-based algorithm from among one or more second type security jobs assigned for execution in a security dedicated core; and designating the selected security jobs to be executed in a second core instead of the security dedicated core.

20. The product of claim 19, wherein designating the selected security jobs to be executed in the second core instead of the security dedicated core comprises:

dequeueing the selected security jobs and transferring the selected security jobs to a cryptographic software driver (CRYPTO_SW) of the second core; and designating the security jobs transferred to the cryptographic software driver for execution on the second core.

* * * * *